US006802338B1

United States Patent
Istre, Jr.

(10) Patent No.: US 6,802,338 B1
(45) Date of Patent: Oct. 12, 2004

(54) FIRE HYDRANT SECURING ARRANGEMENTS

(75) Inventor: Roy Istre, Jr., Irving, TX (US)

(73) Assignee: Hydra-Shield Manufacturing, Inc., Irving, TX (US)

( * ) Notice: Subject to any disclaimer, the term of this patent is extended or adjusted under 35 U.S.C. 154(b) by 0 days.

(21) Appl. No.: 10/682,919

(22) Filed: Oct. 14, 2003

(51) Int. Cl.[7] .............................................. F16K 35/16
(52) U.S. Cl. ..................... 137/383; 137/296; 70/175; 70/176; 70/189; 70/276; 251/65
(58) Field of Search ................. 137/383, 296; 251/65; 70/175, 176, 189, 276

(56) References Cited

U.S. PATENT DOCUMENTS

| 3,840,041 A | 10/1974 | McMurray |
| 3,916,939 A | 11/1975 | Gillard |
| 4,390,038 A | 6/1983 | Salvato |
| 4,620,428 A | 11/1986 | Kopesky |
| 4,716,922 A | 1/1988 | Camp |
| 5,072,750 A | * 12/1991 | Poms et al. .................. 137/296 |
| 5,205,312 A | 4/1993 | Jerman et al. |
| 5,596,893 A | 1/1997 | Stehling et al. |
| 6,089,253 A | * 7/2000 | Stehling et al. ............. 137/382 |

* cited by examiner

*Primary Examiner*—Kevin Lee
(74) *Attorney, Agent, or Firm*—Millen, White, Zelano & Branigan, P.C.

(57) ABSTRACT

A fire hydrant securing arrangement utilizes a magnetic detent to couple an outer body to a center post so that when a wrench with a permanent magnet is mated with the outer body, the magnetic detent connects the outer body to the center post. The center post has an end with a polygonal recess which complements the shape of the hydrant operating nut. The recess is within an insert that has a polygonal periphery engaged by a polygonal inner wall of the center post. The insert is interchangeable with other inserts having recesses of different sizes and configurations so that the securing arrangement is readily acceptable to fire hydrants having different operating nuts of different sizes.

11 Claims, 8 Drawing Sheets

FIRE HYDRANT SECURING ARRANGEMENTS

FIELD OF THE INVENTION

The present invention relates to arrangements for securing fire hydrant operating valves. More particularly, the present invention relates to magnetically operated devices for securing fire hydrant operating valves.

BACKGROUND OF THE INVENTION

Municipal and county water departments are frequently confronted with unauthorized use of fire hydrants by members of the public, who, on occasion, open the valves of the hydrants to obtain water to cool-off on hot days or for the purpose of filling tank trucks with fresh water which is then sold for various purposes, such as filling swimming pools. In cities, open fire hydrants can result in a drop in water pressure to customers and can occasionally endanger a community by reducing the availability of water necessary to fight fires.

In attempts to secure fire hydrants from unauthorized use, fire companies have employed locking devices such as the magnetic valve locks of U.S. Pat. Nos. 4,620,428 and 5,596,893. The particular valve lock disclosed in the '428 patent utilizes a magnetic detent, normally disposed in a center post fixed to a hydrant operating nut, to couple the operating nut of the fire hydrant to an outer body in the form of a capped sleeve, which is normally freely rotatable with respect to the hydrant operating nut. The magnetic detent is attracted by a second magnet permanently mounted in a wrench which cooperates with the outer body to rotate the outer body. Upon coupling the outer body to the center post, rotation of the outer body by the wrench rotates the hydrant operating nut to release water from the hydrant. In the '428 patent the center post is attached to the valve operating nut of the hydrant by a pin that passes laterally through both the center post and the hydrant operating nut. Since the pin has a relatively small diameter, persistent vandals have an opportunity to defeat these devices.

The '893 patent discloses a center post configured inner sleeve with a polygonal opening for receiving the operating nut of the fire hydrant. Since the particular valve lock of '893 patent is only suitable for use with a valve operating nut of one size and configuration, it is necessary to have a different center post for different sized and configured hydrant operating nuts. In that the center post is a brass casting, considerable expense is involved in maintaining an inventory of center posts that are compatible with most, if not all fire, hydrant operating nuts. This problem becomes acute when replacing old fire hydrants with new fire hydrants that may have different hydrant operating nuts. A frequent response is to dispose of these magnetic valve locks and buy new ones at considerable expense.

SUMMARY OF THE INVENTION

In view of the aforementioned considerations, a valve operator securing arrangement is provided for fire hydrants having valve stems connected to hydrant operating valves wherein the valve stems have hydrant operating nuts with particular polygonal exterior shapes. Rotation of the valve stems by gripping and rotating the hydrant operating nuts opens and closes the valves. The arrangement includes a device comprising a center post having a first end with a first recess of a selected shape therein, which first recess opens outwardly therefrom. The center post also has a second end defining a first coupling element. At least one insert is disposed non-rotatably within the recess of the center post. The insert has an axial opening therein of a polygonal shape complementing the polygonal exterior shape of the hydrant operating nut for non-rotatably receiving the hydrant operating nut therein, wherein rotation of the center post positively rotates the hydrant operating nut. An outer body is rotationally mounted over and around the center post for rotation with respect to the center post. The outer body includes a second coupling element. A movable magnetizable element is provided which is urged to a first position, decoupling the first and second coupling elements, and is movable to a second position coupling the first and second elements in a non-rotational relationship, wherein rotation of the outer body rotates the center post to rotate the valve stem and operate the valve. Upon employing a wrench with a permanent magnet and mechanically interlocking the wrench with the outer body, the outer body is enabled for rotating the hydrant operating nut when the magnetizable element is moved from the first to the second position.

In a further aspect of the invention, the particular polygonal exterior shape of the hydrant operating nut is a pentagon, a square or a hexagon.

In a further aspect of the invention, the first recess in the center post has a polygonal shape and the insert has a polygonal exterior shape which compliments the polygonal shape of the recess to lock the insert and center post in a non-rotatable relationship.

In a still further aspect of the invention, the insert is slidable into the first recess in an axial direction.

In a still further aspect of the invention, the arrangement comprises a system having plurality of inserts each having the same exterior shape as the shape of the first recess and each having an axial opening of a polygonal shape complementing one of the particular polygonal exterior shapes of the hydrant operating nuts.

In still a further aspect of the invention, the selected shape of the first recess in the center post and the exterior shape of each insert is pentagonal.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
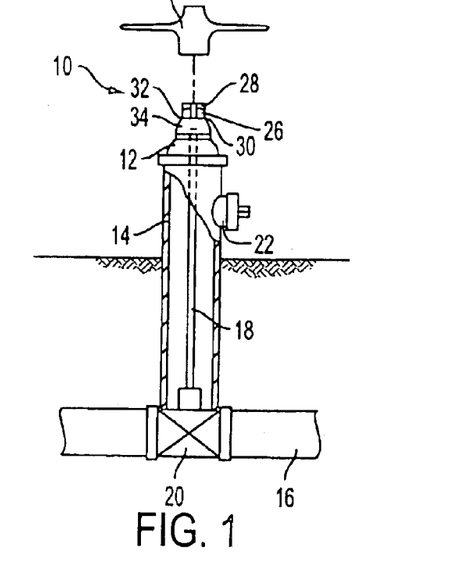
FIG. 1 is a side view showing a valve operator securing arrangement in accordance with the present invention mounted on a fire hydrant.

Referring now to FIG. 1 there is shown a fire hydrant securing arrangement 10 configured in accordance with the present invention. The arrangement 10 is mounted on the domed top 12 of a fire hydrant 14 which is in turn connected to a water main 16 by a valve stem 18 that opens and closes a hydrant operating valve 20. Upon opening the valve 20, water flows through an outlet 22 for fighting fires and occasionally for other purposes. The fire hydrant securing arrangement 10 is operated by a key wrench 24 which receives and mates with an outer body 26, which has a cruciform top 28 that is positively engaged within a cruciform recess within the key wrench 24. The outer body 26 has a lower end 30 which is received through an upper end 32 of a mating collar 34 that abuts the domed top 12 of the hydrant 14. The only elements of the fire hydrant securing arrangement 10 which are normally visible are the outer body 12 and the mating collar 34. The key wrench 24 is normally carried on fire trucks and is not available to the general public. Rotation of the outer body 26 can not open the valve 20 unless the key wrench 24 is used to couple the outer body 26 to the valve stem 18. Without the key wrench 24 being used, the outer body 26 simply spins with respect to the mating collar 34.

Figure 2:
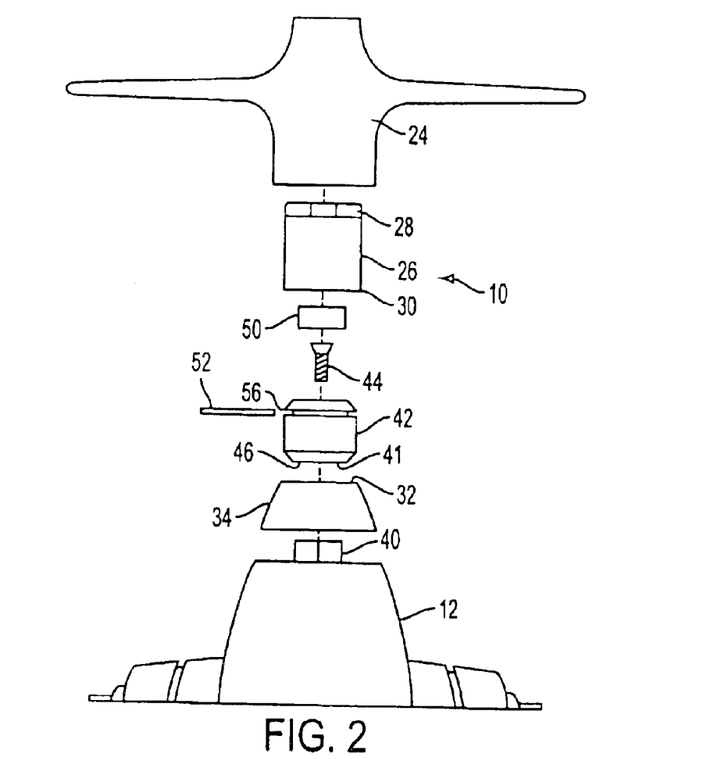
FIG. 2 is an exploded view of the fire hydrant securing arrangement of FIG. 1 showing the separate components thereof.

Referring now to FIG. 2 where the elements of the fire hydrant security arrangement 10 are separately shown in an exploded view, it is seen that the mating collar 34 covers a hydrant operating nut 40 which is fixed to the valve stem operator 18 that is used to open the valve 20. Partially within the mating collar 34, and covered by the outer body 26, is a center post 42. The center post 42 is secured by an attachment bolt 44 that passes axially through the center post and is threaded into a threaded bore 45 formed in the hydrant operating nut 40. The center post 42 has a first end 46 with a polygonal first recess 47 that receives the polygonal nut 40. A magnetizable detent 50 is received in a top recess in the center post 42 and is slidable in an axial direction with respect to the center post in order to non-rotatably couple the outer body 36 to the center post.

Figure 3:
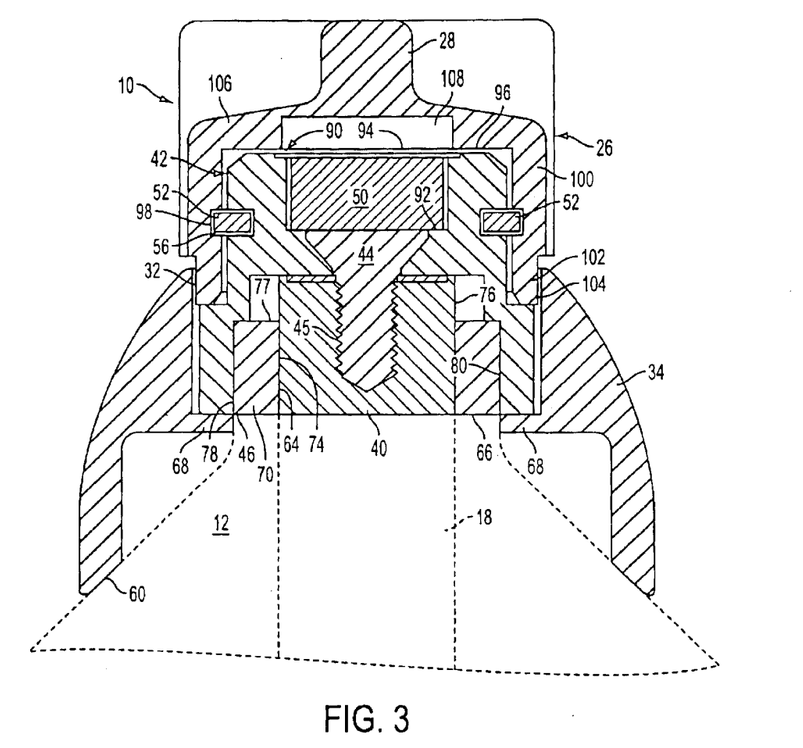
FIG. 3 is a side elevation showing the components of FIG. 2 assembled.
Figure 4:
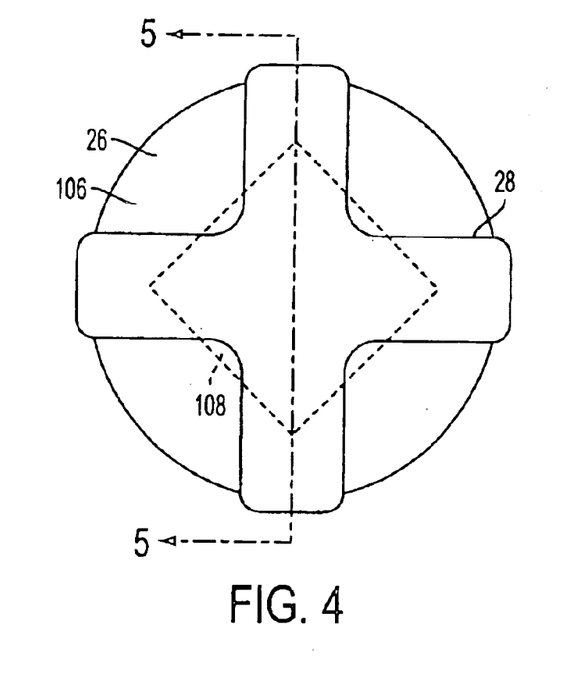
FIG. 4 is a top view of an outer body providing part of the arrangement of FIGS. 1–3.
Figure 5:
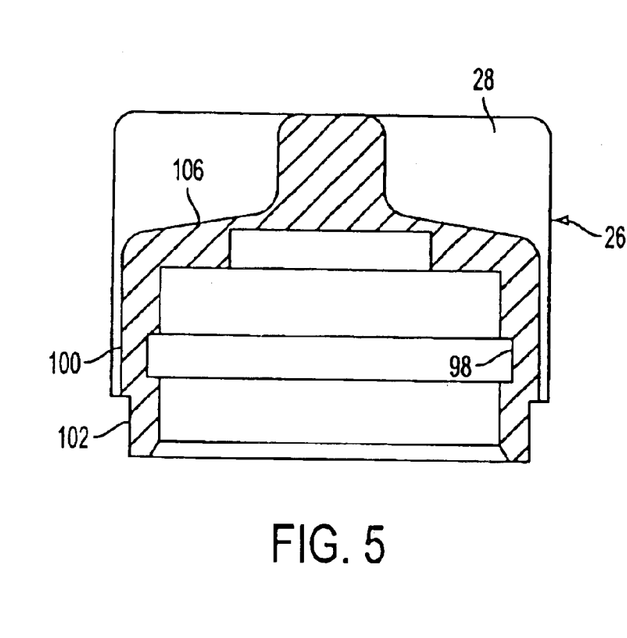
FIG. 5 is an elevation taken along lines 5—5 of FIG. 4.
Figure 6:
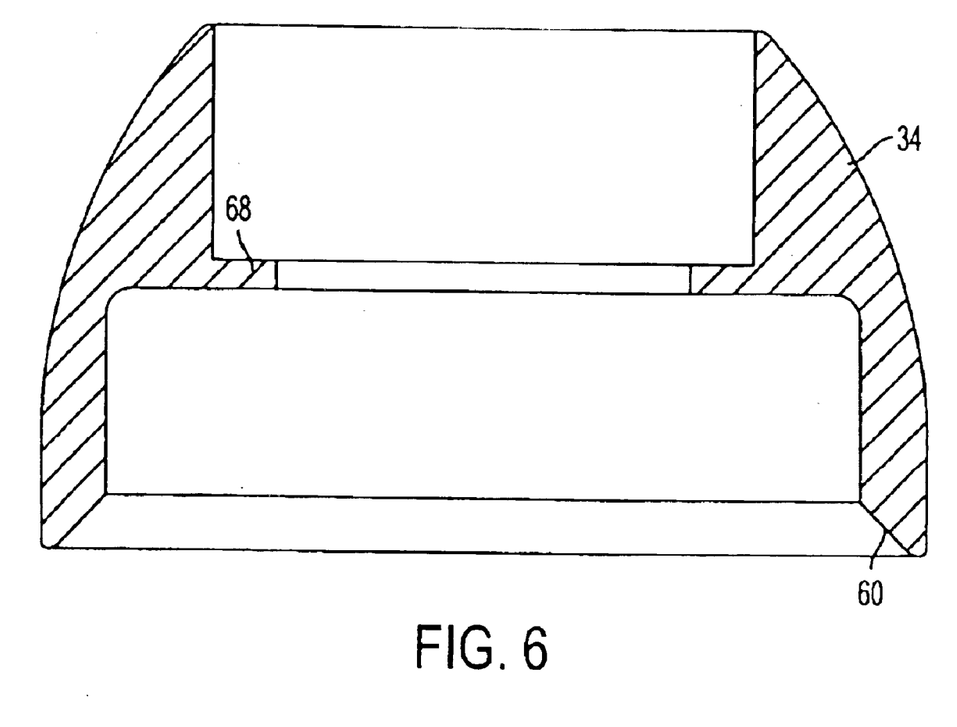
FIG. 6 is a side elevation of a mating collar used with the arrangement of FIGS. 1–3.

After the center post 42 is attached to the hydrant operating nut 40 and the magnetizable detent is placed in the center post, the outer body 26 is coupled to the center post 42 in an axial direction by a sheer ring 52 that is received in an annular groove 56 disposed around the center post 42. The sheer ring 52 is also received in a groove Within the outer body 26 so as to hold the outer body on the center post 42. To facilitate coupling the outer body 26 to the center post 42 by using the sheer ring 52, the sheer ring 52 is radially split so that it can expand and contract in a radial direction. Upon axially pushing the outer body 26 over the center post 42, the sheer ring 52 is radially pushed into the groove 56 in the center post and expands into the groove 98 (See FIG. 3) in the outer body to rotationally couple the center post to the outer body FIG. 3 shows in more detail elements of the fire hydrant securing arrangement 10 assembled on the dome 12 of the fire hydrant 14. The separate elements combined in FIG. 3 are shown isolated from one another in FIGS. 4–13. The mating collar 34 (FIG. 6) is placed on the domed top 12 first with a beveled end 60 thereof resting against the domed top. The center post 42 (FIGS. 9–11) is then inserted into the opening 32 through the mating collar 34 with the hydrant operating nut 40 received in the first recess 47 in a first opening 64, a first end 66 of the center post 42. The first end 66 of the center post 42 rests on an annular shelf 68 projecting radially inwardly from the mating collar 34.

Disposed within the first opening 64 of the center post 42 is an insert 70 (FIGS. 11–13) which has a polygonal inner surface 74 that has a shape corresponding to the polygonal external surface 76 of the hydrant operating nut 40 so that the center post 42 is non-rotatably coupled with the hydrant operating nut 40. The insert 70 abuts a shoulder 76 on the center post 42 (see FIG. 9) and is axially slidable in and out of the polygonal opening of the center post 42. In order to prevent rotation of the insert 70 with respect to the center post 42, the insert 70 has a polygonal outer surface 78 which complements a polygonal inner surface 80 of the center post 42 defining a polygonal recess 81. Consequently when the center post 42 is rotated, it is rotationally locked to the hydrant operating nut 40.

Figure 9:
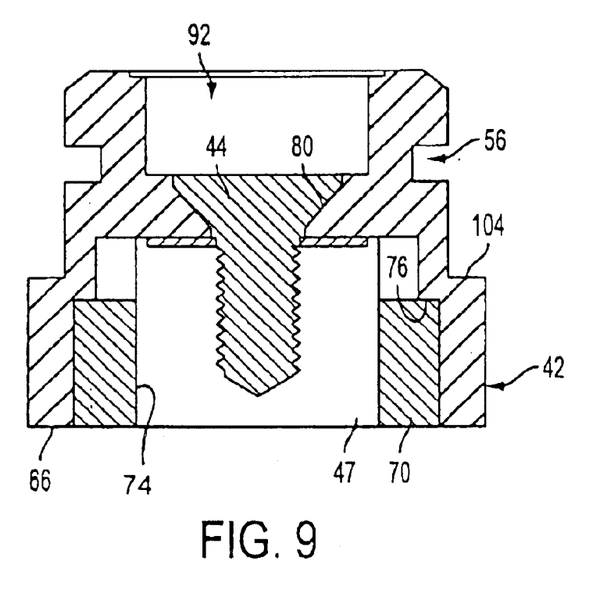
FIG. 9 is a side elevation of a center post used with the arrangement of FIGS. 1–3.

The center post 42 has a beveled opening 80 extending axially therethrough which receives the bolt 44 (see also FIG. 9). In order to axially fix the center post 42 on the fire hydrant operating nut 40 the threaded hole 45 is tapped through the hydrant operating nut 40 so that the bolt 44 can axially fix the center post 42 on the hydrant operating nut.

Figure 7:
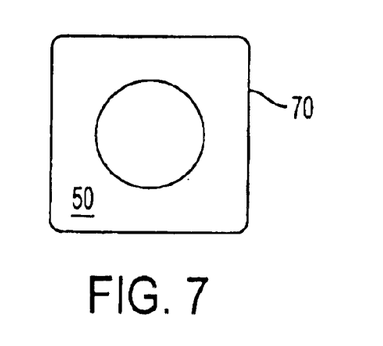
FIG. 7 is a top view of a magnetizable detent used with the arrangement of FIGS. 1 and 2.
Figure 8:
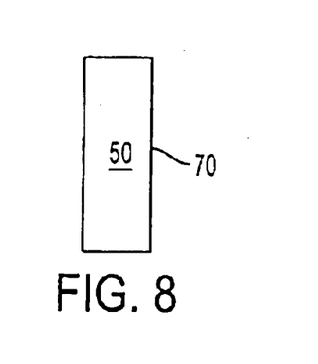
FIG. 8 is a side view of the matnetizable detent of FIG. 7.
Figure 10:
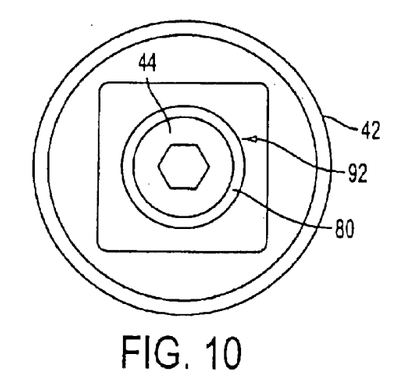
FIG. 10 is a top view of the center post of FIG. 9.

The magnetic detent 50 (see also FIGS. 7 and 8) is received in a second recess 90 (see also FIG: 10) in the top end center post 42 and rests on a rectangular shelf 92 with the top surface 94 of the magnetizable detent being flush with the top surface 96 of the center post 42. Consequently, when the outer body 26 is mounted on and over the center post 42, the outer body will be freely rotatable on the center post as long as the magnetizable detent 50 remains in the slot in a first position in which it rests on the shelf 92.

The outer body 26 (FIGS. 4 and 5) is secured over the center post by the split ring 52 which is received in the annular, outwardly facing groove 56 in the center post and an annular inwardly facing groove 98 in the outer body 26. The split ring 52 is compressed into the slot 56 when a sleeve portion 100 of the outer body 26 is slid over the center post 42. Upon the groove 98 aligning with the groove 56, the resilient sheer ring 52 expands radially into the groove 98 thereby axially securing the outer body 26 to the center post 42. The lower end 102 of the sleeve portion 100 of the outer body 26 extends into the opening 32 and abuts a shelf 104 on the center post 26.

Within a cap portion 106 of the outer body 26 there is a square recess 108 which receives the magnetizable detent 50 when a magnet in the key wrench 24 (FIGS. 1 and 2) attracts the magnetizable detent and pulls the magnetizable detent into the square recess 108. Since the recesses 108 and 90 are both polygonal in that they are square, the outer body 26 is positively locked to the center post 42 so that when the key wrench 24 locks with the cruciform projection 28 and is rotated, torque is transmitted through to the hydrant operating nut 40 enabling a fireman to open the valve 20 of FIG. 1.

Figure 11:
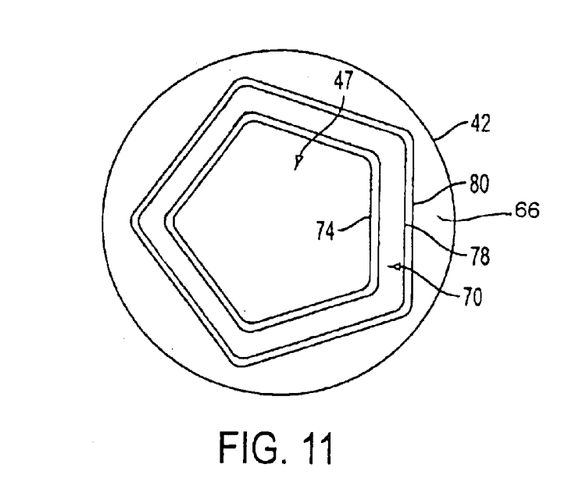
FIG. 11 is a bottom view of the center post of FIG. 9.
Figure 12:
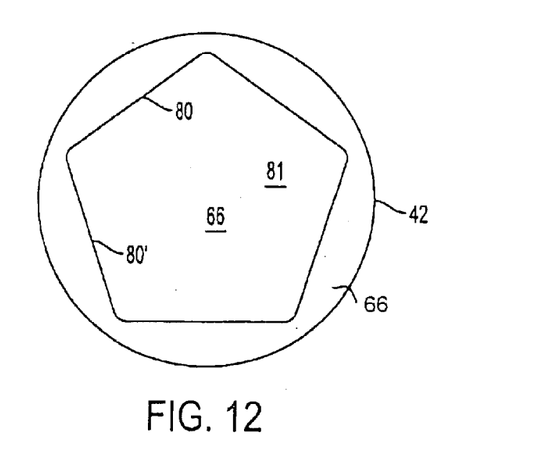
FIG. 12 is a bottom view of a master pentagon cast in the center post casting of FIGS. 9, 10 and 11.

FIGS. 11, 12, 13 and 14 disclose embodiments for the structure of the insert 70, as well as the structure of the first end 66 of the center post 42 (see also FIG. 9). The insert 70 has a polygonal or non-round outer surfaces 78, 78' and 78", while the center post 42 has a polygonal or non-round inner wall 80. In the preferred embodiment of FIGS. 11–14, the polygonal inner wall 80 on the center post 42 has five abutting walls and is in the shape of a pentagon. The insert 70 shown in FIG. 11 has a pentagonal outer wall 78, which complements the illustrated pentagonal inner wall 80 of the center post 42 when the insert is slid into the pentagonal recess 81 defined by the inner wall 80. In the embodiment of FIG. 11, the recess 70 has a pentagonal inner wall 74 (see also FIG. 9) that defines the first recess 47 that receives the hydrant operating nut 40 (see FIGS. 2 and 3).

It is emphasized that while the inner wall 80 of the center post 42 is disclosed as pentagonal, the wall may have any other polygonal shape. For example, the wall 80 may be square or hexagonal. Pentagonal is the preferred shape of the wall 80 because it provides a thickness for the first end 66 of the center post 42 which is sufficient to withstand assaults by vandals who may attack the securing arrangement 10 with heavy implements such as sledge hammers.

Figure 13:
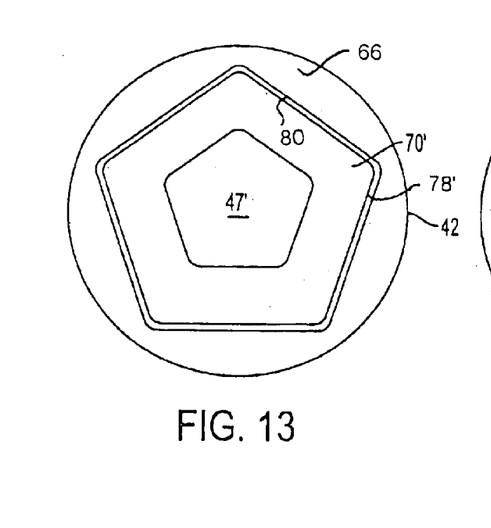
FIG. 13 shows an insert having a pentagonal shape.
Figure 14:
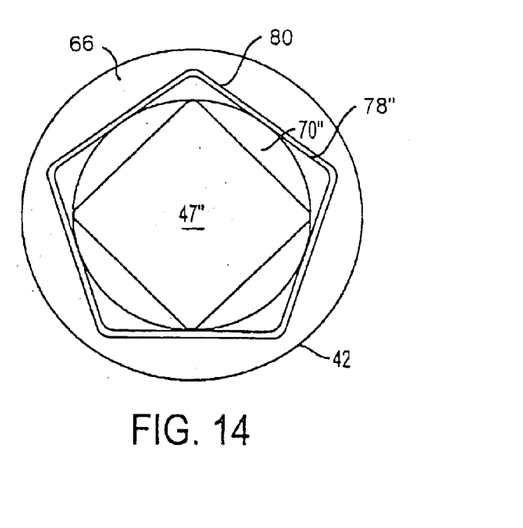
FIG. 14 shows an insert having a square shape.

In FIG. 13 the recess 47' of the insert 70' is pentagonal, but relatively small, for example about 1 $\frac{1}{8}$ inch, whereas the pentagonal recess 47 in FIG. 11 is relatively large, for example about 1 and $\frac{11}{16}$ inch. In FIG. 14 the opening 47" in the insert 70" is square in order to mate with a square fire hydrant operating nut 40. The square recess 47" may relatively large, having sides which are about 1 $\frac{1}{4}$ inch. However, the square recess 47" of FIG. 14 can be of any dimension, as long as it is not larger than the external area defined by the insert 70". In still other embodiments the recess 47 can be a hexagon of any size necessary to complement a hexagonal hydrant operating nut 40. For large hexagonal operating nuts (for example, nuts having a diameter of about 1 $\frac{13}{16}$), the opening 81 of FIG. 12 can be reconfigured as a hexagon and the center post 42 used without an insert 70.

From the foregoing description, one skilled in the art can easily ascertain the essential characteristics of this invention, and without departing form the spirit and scope thereof, can make various changes and modifications of the invention to adapt it to various usages and conditions.

I claim:

1. A valve operator securing arrangement for fire hydrants having a valve stem connected to a hydrant operating valve, the valve stem having a hydrant operating nut with a particular polygonal exterior shape, wherein rotation of the valve stem by gripping and rotating the hydrant operating nut opens and closes the hydrant operating valve, the arrangement including a device comprising:

a center post having a first end with a first recess of a selected shape therein, the first recess opening outwardly therefrom, and the center post having a second end defining a first coupling element;

at least one insert disposed non-rotatably within the recess of the center post, the insert having an axial opening therein of a polygonal shape complementing the particular polygonal exterior shape of the hydrant operating nut for non-rotatably receiving the valve nut therein, wherein rotation of the center post positively rotates the valve nut;

an outer body rotationally mounted over and around the center post for rotation with respect to the center post, the outer body including a second coupling element, and a movable magnetizable element disposed in a first position for decoupling the first and second coupling elements, the magnetizable element being movable to a second position for coupling the first and second elements in a non-rotational relationship, wherein rotation of the outer body rotates the center post to rotate the valve stem and operate the valve;

whereby upon employing a wrench with a permanent magnet and mechanically interlocking the wrench with the outer body, the outer body is enabled to rotate the hydrant operating nut when the magnetizable element is moved by the permanent magnet from the first position to the second position.

2. The valve operator securing arrangement of claim 1 wherein the particular polygonal exterior shape of the hydrant operating nut is pentagonal.

3. The valve operator securing arrangement of claim 1 wherein the particular polygonal exterior shape of the hydrant operating nut is square.

4. The valve operator securing device of claim 3 wherein the particular polygonal exterior shape of the hydrant operating nut is hexagonal.

5. The valve operator of claim 1 wherein the first recess in the center post has a polygonal shape and wherein the insert has a polygonal exterior shape which compliments the polygonal shape of the recess to lock the insert and center post in a non-rotatable relationship.

6. The valve operator securing arrangement of claim 5 wherein the insert is slidable into the recess in an axial direction.

7. The valve operator securing arrangement of claim 1 wherein the arrangement comprises a system having plurality of inserts, each insert having the same exterior shape as the shape of the first recess and each insert having an axial opening of a polygonal shape complementing one of the particular polygonal exterior shapes of the hydrant operating nuts.

8. The valve operator securing arrangement of claim 7 wherein the inserts are axially slidable into the first recess so that the proper insert for a hydrant operating nut of a particular exterior polygonal exterior shape is selectable for the device.

9. The valve operator securing arrangement of claim 8 wherein the polygonal shapes of the axial openings in the inserts are pentagonal, square or hexagonal.

10. The valve operator of claim 9 wherein the selected shape of the first recess and the exterior shape of each insert is pentagonal.

11. The valve operator of claim 1 wherein the selected shape of the first recess and the exterior shape of each insert is pentagonal.

* * * * *